(12) United States Patent
Hwang et al.

(10) Patent No.: US 11,533,004 B2
(45) Date of Patent: Dec. 20, 2022

(54) ROTARY MOTOR HAVING A ROTATION UNIT CONFIGURED TO MAKE AN ELASTIC DEFORMATION

(71) Applicant: KOREA INSTITUTE OF SCIENCE AND TECHNOLOGY, Seoul (KR)

(72) Inventors: Donghyun Hwang, Seoul (KR); Byeongkyu Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 259 days.

(21) Appl. No.: 16/953,271

(22) Filed: Nov. 19, 2020

(65) Prior Publication Data
US 2021/0399655 A1 Dec. 23, 2021

(30) Foreign Application Priority Data

Jun. 19, 2020 (KR) .................. 10-2020-0074734

(51) Int. Cl.
*H02N 2/10* (2006.01)
*H02N 2/12* (2006.01)

(52) U.S. Cl.
CPC .............. *H02N 2/103* (2013.01); *H02N 2/12* (2013.01)

(58) Field of Classification Search
CPC .......... H02N 2/103; H02N 2/12; H02N 2/043; H02N 2/101; H02N 2/123; H01L 41/04
See application file for complete search history.

(56) References Cited

U.S. PATENT DOCUMENTS

2010/0261595 A1* 10/2010 Schaefer .................. B25J 11/00
494/20

FOREIGN PATENT DOCUMENTS

| CN | 108696182 A | * 10/2018 | ............... H02N 2/12 |
| CN | 109980990 A | * 7/2019 | |
| JP | 2002-281768 A | 9/2002 | |
| JP | 2014-180123 A | 9/2014 | |
| JP | 2016-127703 A | 7/2016 | |
| KR | 10-0679914 B1 | 2/2007 | |
| KR | 10-1703483 B1 | 2/2017 | |
| WO | 2015/176692 A1 | 11/2015 | |

OTHER PUBLICATIONS

Yongfei Gu et al, "Dynamics analysis for the clamping mechanisms of a rotary inchworm piezoelectric motor," Journal of Vibroengineering, 2016, vol. 18, Issue 4, pp. 2229-2239.
Jianfang Liu et al., "Novel precision piezoelectric step rotary actuator," Frontiers of Mechanical Engineering in China, vol. 2, No. 3, pp. 356-360, 2007.
Jianping Li et al., "A piezoelectric-driven rotary actuator by means of inchworm motion," Sensors and Actuators A, vol. 194, pp. 269-276, Feb. 26, 2013.
(Continued)

*Primary Examiner* — Emily P Pham
(74) *Attorney, Agent, or Firm* — Rabin & Berdo, P.C.

(57) ABSTRACT

The present disclosure provides a rotary motor, which includes: a clamping member having a gripping unit installed at an inner circumference of a rotor to grip the rotor during a predetermined time; and a driving member installed at the inner circumference of the rotor and having a rotation unit configured to make an elastic deformation to rotate by a predetermined angle and then return to an original state so that the rotor is rotated.

9 Claims, 10 Drawing Sheets

(56) References Cited

OTHER PUBLICATIONS

Khaled El Bannan, "Development of a Compact Piezoworm Actuator for MR Guided Medical Procedures," Graduate Program in Mechanical and Materials Engineering, The University of Western Ontario, 2012.
Sang-Chae Kim et al., "Precise rotary motor by inchworm motion using dual wrap belts," Review of Scientific Instruments, vol. 70, No. 5, pp. 2546-2550, May 1999.
Shubao Shao et al., "A piezo-driven rotary inchworm actuator featured with simple structure and high output torque," International Journal of Applied Electromagnetics and Mechanics, vol. 59, pp. 317-325, 2019.
Shupeng Wang et al., "A long range piezoelectric rotary motor with continuous output: Design, analysis and experimental performance," Sensors and Actuators A, vol. 263, pp. 179-187, Jun. 4, 2017.
Shupeng Wang et al., "Design, analysis and experimental performance of a novel stick-slip type piezoelectric rotary actuator based on variable force couple driving," Smart Materials and Structures, vol. 26, No. 055005, pp. 1-9, Apr. 6, 2017.
Siyang Song et al., "Piezoelectric inchworm rotary actuator with high driving torque and self-locking ability," Sensors and Actuators A, vol. 282, pp. 174-182, Aug. 31, 2018.
Tiberiu-Gabriel Zsurzsan et al., "Investigating the Electromechanical Coupling in Piezoelectric Actuator Drive Motor Under Heavy Load," IEEE International Power Electronics and Application Conference and Exposition, 2014.
Xiantao Sun et al., "A novel piezo-driven linear-rotary inchworm actuator," Sensors and Actuators A, vol. 224, pp. 78-86, Jan. 31, 2015.

\* cited by examiner

FIG. 7A

| time | 0 → | 1 → | 2 → | 3 → | 4 → | 5 → | 6 |
|---|---|---|---|---|---|---|---|
| ROTOR ROTATION DIRECTION (CW) | $C_1, C_2$ | $C_1$ | $C_1, D$ | $C_1, D, C_2$ | $D, C_2$ | $C_2$ | |
| SECOND CLAMPING MEMBER [C2] | | | | | | | |
| DRIVING MEMBER [D] | | | | | | | |
| FIRST CLAMPING MEMBER [C1] | | | | | | | |

FIG. 7B

| time | 0 → 1 | 1 → 2 | 2 → 3 | 3 → 4 | 4 → 5 | 5 → 6 |
|---|---|---|---|---|---|---|
| ROTOR ROTATION DIRECTION (CCW) | $C_1, C_2$ | $C_2$ | $D, C_2$ | $C_1, D, C_2$ | $C_1, D$ | $C_1$ |

ROTARY MOTOR HAVING A ROTATION UNIT CONFIGURED TO MAKE AN ELASTIC DEFORMATION

CROSS-REFERENCE TO RELATED APPLICATION

This application claims priority to Korean Patent Application No. 10-2020-0074734, filed on Jun. 19, 2020, and all the benefits accruing therefrom under 35 U.S.C. § 119, the contents of which in its entirety are herein incorporated by reference.

TECHNICAL FIELD

This disclosure relates to a rotary motor, and more particularly, to a rotary motor for the development of a small motor, which is based on a piezoelectric element and uses an inchworm method.

BACKGROUND ART

Motors developed using piezoelectric elements may be classified into an actuation type utilizing a mode shape of an actuator by using a resonance frequency band and a motor type utilizing the deformation of an actuator in a non-resonance frequency band. In particular, the motors using a non-resonance frequency band typically include a stick-slip (inertia drive) type and an inchworm type.

In the stick-slip type, a motion is generated using a momentary impact force of a piezoelectric element actuator, and in the inch-worm type, a motion is generated by sequential driving of a clamping unit and a driving unit.

In a conventional device, a motor using a resonance frequency band has a problem of a very low output force despite a high output speed.

In addition, in the stick-slip type, a motion occurs in a reverse direction after instantaneous actuation due to continuous contact between a motion generating unit and a shaft.

Moreover, in the inchworm type, there is a problem of a larger size compared to other types, due to the clamping member and the driving member.

DISCLOSURE

Technical Problem

This disclosure is directed to providing a rotary motor, which enables a large torque output while reducing the size of an inchworm type motor.

Technical Solution

In one general aspect, there is provided a rotary motor, comprising: a clamping member having a gripping unit installed at an inner circumference of a rotor to grip the rotor during a predetermined time; and a driving member installed at the inner circumference of the rotor and having a rotation unit configured to make an elastic deformation to rotate by a predetermined angle and then return to an original state so that the rotor is rotated.

According to an embodiment of the present disclosure, there may be provided two clamping members, and the two clamping members may be disposed at both sides with the driving member being interposed therebetween.

Preferably, the clamping member may further include a piezoelectric unit configured to elastically deform in one direction, and when the piezoelectric unit makes a tensile strain, the gripping unit may grip the inner circumference of the rotor.

Preferably, the clamping member may further include: a coupling unit configured to support both ends of the piezoelectric unit; and a transmission unit connected to the coupling unit to transmit a stress to the gripping unit in a direction intersecting with the one direction.

According to another embodiment of the present disclosure, the two clamping members may be disposed in a state of being rotated by the predetermined angle based on a rotary shaft around which the rotor rotates.

In addition, one of the clamping members may be connected to the rotation unit to rotate together with the rotation unit, so that the rotor is rotated.

According to still another embodiment of the present disclosure, the driving member may further include two piezoelectric units configured to elastically deform in one direction and provided at one diagonal locations of the driving member, and when the two clamping members make a tensile strain, the rotation unit may be rotated by the predetermined angle, and when the two clamping members return to an initial state, the rotation unit may return to the original state.

The driving member may further include a support unit configured to support both ends of the piezoelectric unit and connected to the rotation unit to rotate the rotation unit in a state where the piezoelectric unit makes a tensile strain; and a connection hole formed in the rotation unit so that the rotation unit is connected to rotate together with the clamping member.

Preferably, the driving member may further include two maintaining units provided at the other diagonal locations of the driving member to elastically support the rotation unit.

DESCRIPTION OF DRAWINGS

FIG. 7A is a graph showing a motion sequence of the clamping member and the driving member when the rotor rotates in a clockwise direction.

FIG. 7B is a graph showing a motion sequence of the clamping member and the driving member when the rotor rotates in a counterclockwise direction.

BEST MODE

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

Figure 1:
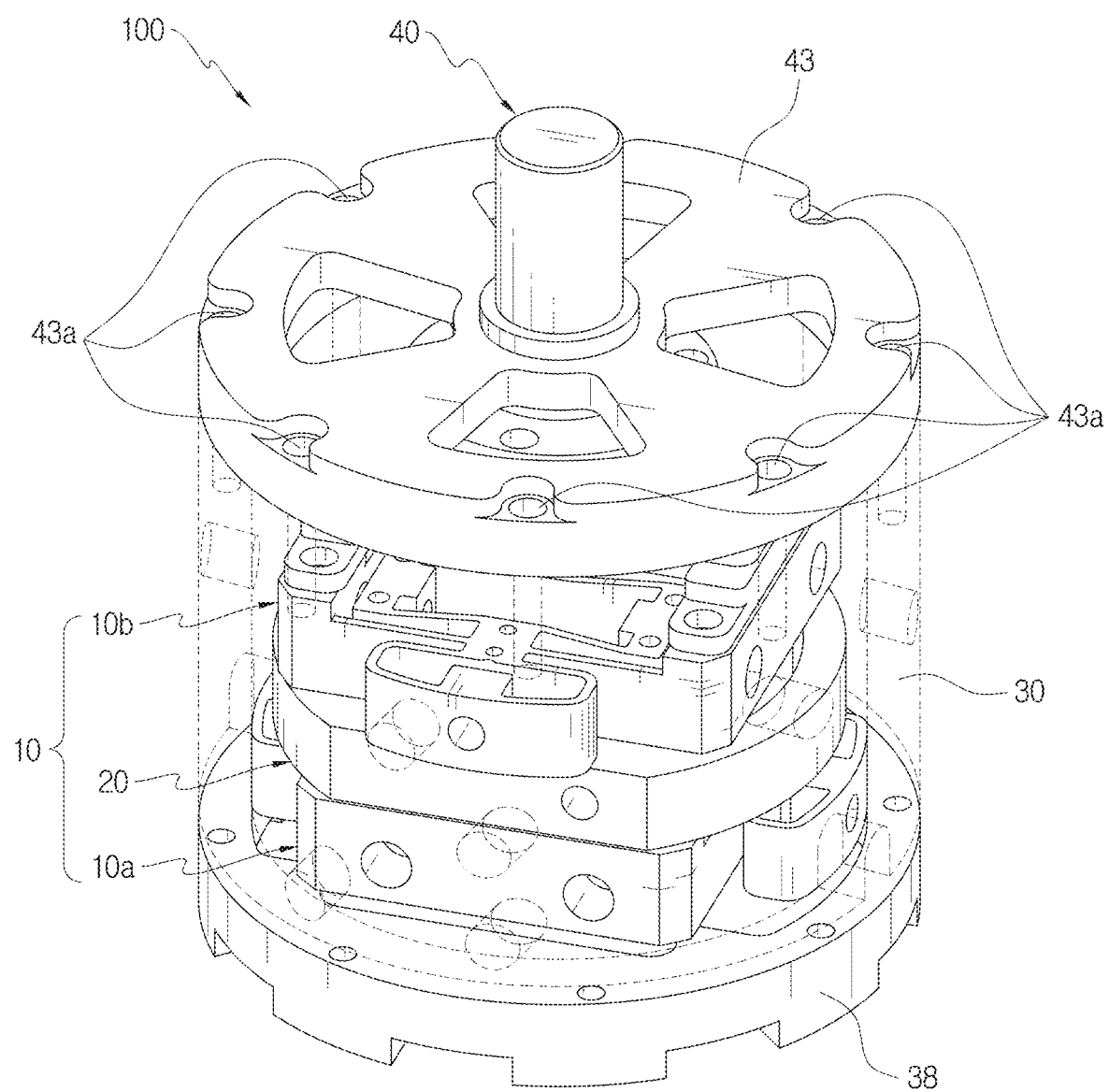
FIG. 1 is a perspective view showing a rotary motor of the present disclosure.
Figure 2:
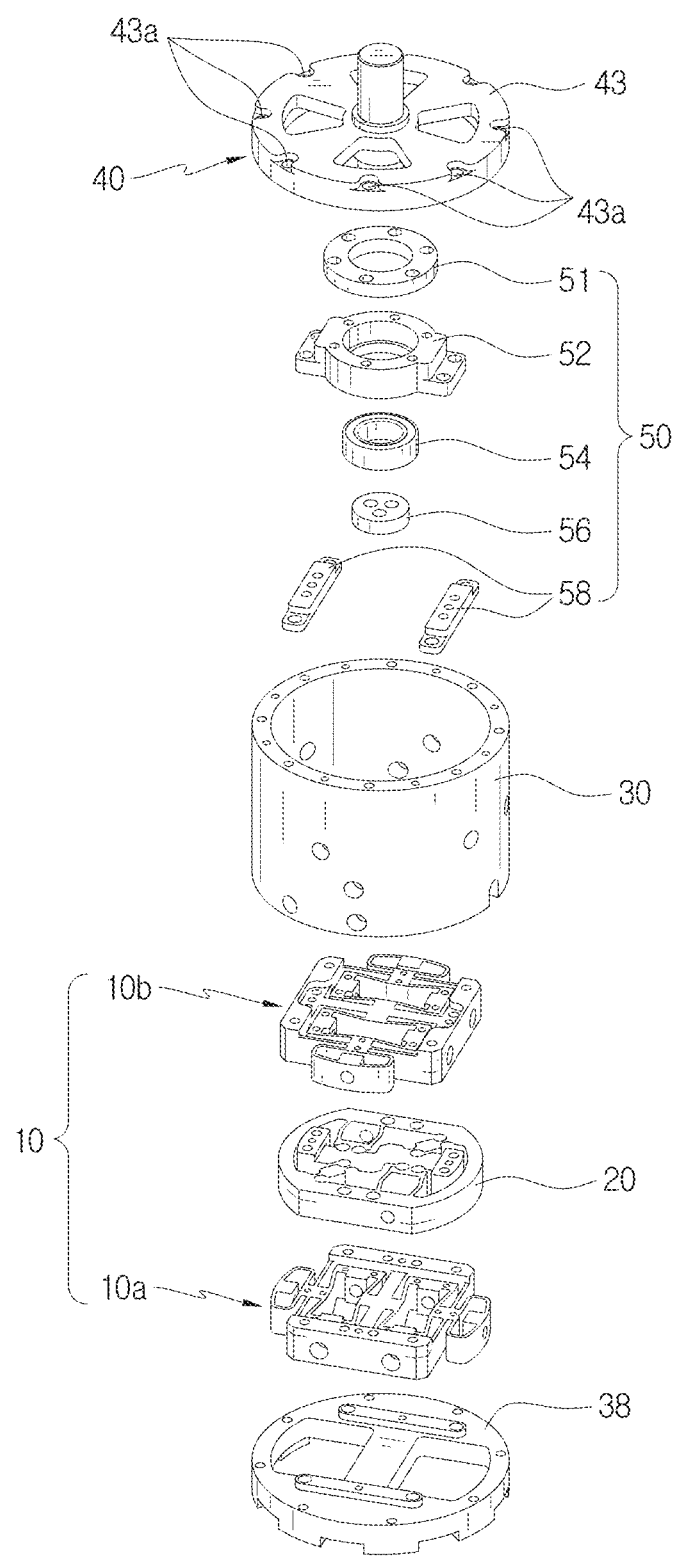
FIG. 2 is an exploded perspective view showing the rotary motor of FIG. 1 in a disassembled state.
Figure 3:
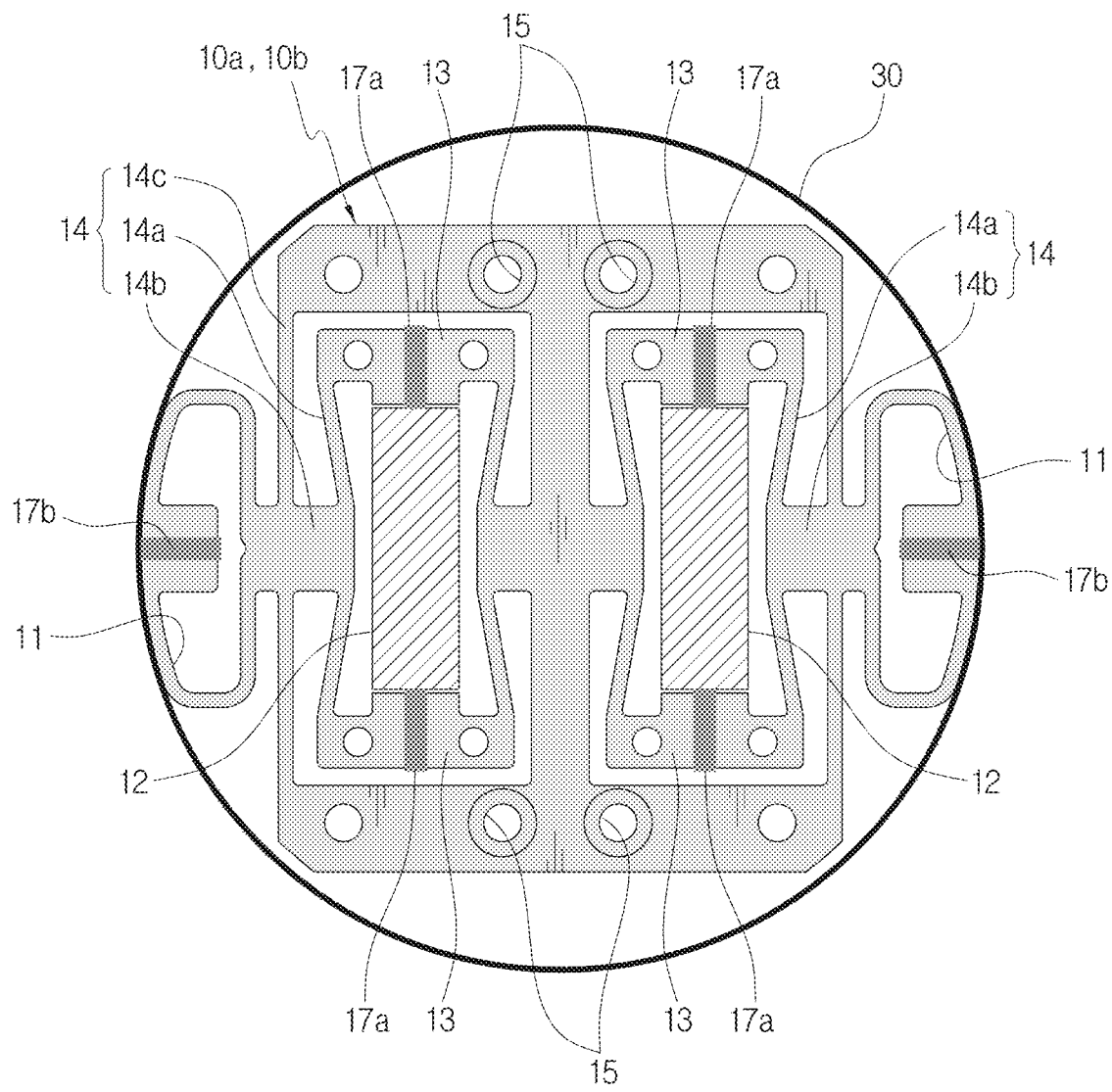
FIG. 3 is a sectional view showing a clamping member.
Figure 4:
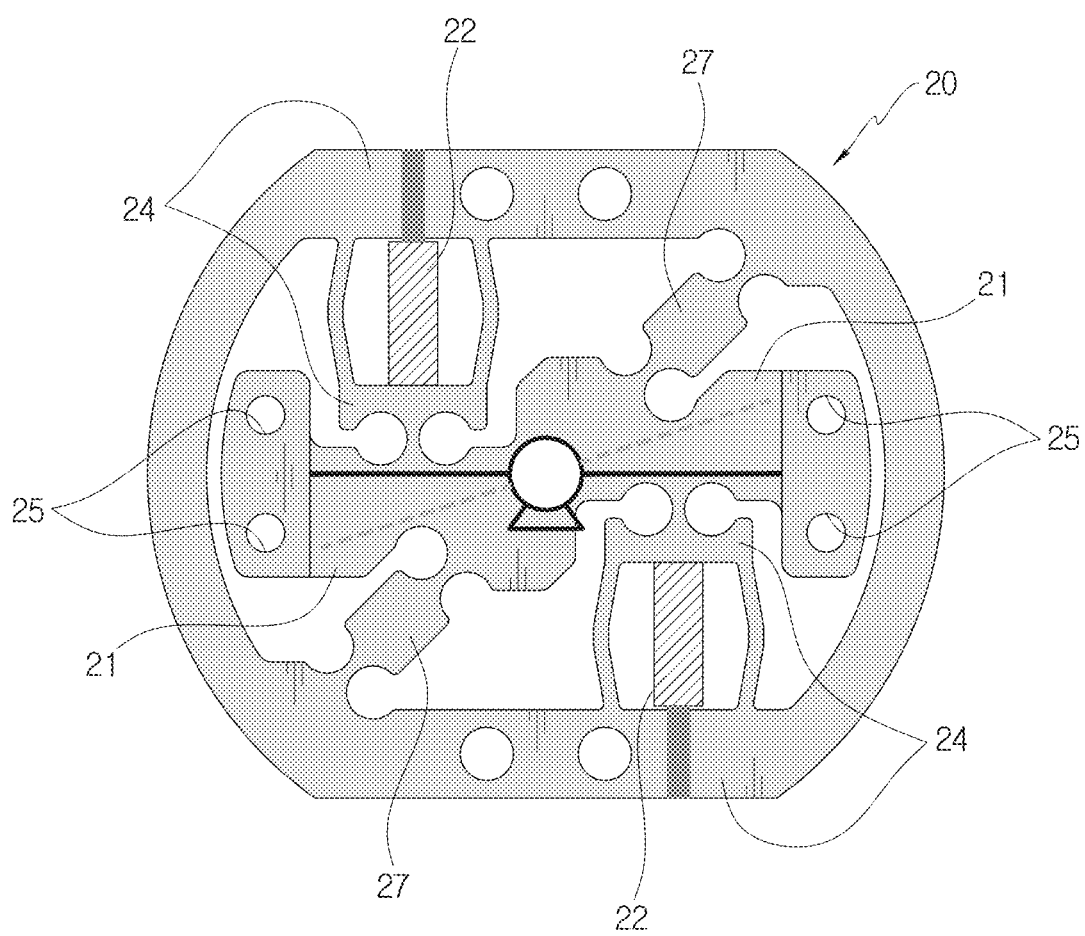
FIG. 4 is a sectional view showing a driving member.

FIG. 1 is a perspective view showing a rotary motor 100 of the present disclosure, and FIG. 2 is an exploded perspective view showing the rotary motor 100 of FIG. 1 in a disassembled state. Also, FIG. 3 is a sectional view showing a clamping member 10, and FIG. 4 is a sectional view showing a driving member 20.

Hereinafter, the structure of the rotary motor 100 of the present disclosure will be described with reference to FIGS. 1 to 4.

The rotary motor 100 of the present disclosure includes a clamping member 10 and a driving member 20.

The clamping member 10 includes a gripping unit 11. The gripping unit 11 is installed at an inner circumference of a rotor 30 to grip the rotor 30 during a predetermined time. As shown in FIG. 3, the gripping unit 11 is preferably formed in an arcuate shape so that an end of the gripping unit 11 in contact with the rotor 30 may contact the inner circumference of the rotor 30.

There may be provided two clamping members 10. The two clamping members 10 may be disposed at both sides with the driving member 20 being interposed therebetween. Referring to FIGS. 1 and 2, an example where a first clamping member 10a is disposed under the driving member 20 and a second clamping member 10b is disposed over the driving member 20 is illustrated.

The first and second clamping members 10a, 10b are arranged in a state of being rotated by a predetermined angle based on a rotary shaft of the rotor 30. For example, the first and second clamping members 10a, 10b are preferably arranged to be rotated by 90°.

For example, the second clamping member 10b may rotate together with the driving member 20, explained later. Meanwhile, it is preferable that the first clamping member 10a is simply coupled to the driving member 20, explained later, and does not rotated together with the driving member 20.

In addition, the clamping member 10 may further include a piezoelectric unit 12 that elastically deforms in one direction. When the piezoelectric unit 12 makes a tensile strain, the gripping unit 11 grips the inner circumference of the rotor 30.

The piezoelectric unit 12 may be an actuator, and, for example, may be a stack-type piezoelectric element.

In addition, the piezoelectric unit 12 may adopt a Rhombus type mechanism in order to extend the displacement of the piezoelectric unit 12 and apply a preload.

The clamping member 10 may further include a coupling unit 13 and a transmission unit 14.

The coupling unit 13 may support both ends of the piezoelectric unit 12. Referring to FIG. 3, the coupling units 13 respectively supporting upper and lower ends of the piezoelectric unit 12 are shown. If the piezoelectric unit 12 is deformed in a vertical direction, the relative distance between the coupling units 13 at the upper and lower ends is changed, and thus the transmission unit 14 may be moved.

If the relative distance of the coupling units 13 is shortened, the transmission unit 14 moves closer to the center of the circle of the rotor 30. If the relative distance of the coupling units 13 is increased, the transmission unit 14 moves away from the center of the circle of the rotor 30.

The transmission unit 14 may be connected to the coupling unit 13 to transmit a stress to the gripping unit 11 in a direction intersecting with the one direction. The transmission unit 14 may include a first transmission unit 14a connected to the coupling unit 13 in an intersecting direction, a second transmission unit 14b connected to the first transmission unit 14a in an intersecting direction, and a third transmission unit 14c connected to the second transmission unit 14b to linearly transmit the stress transmitted from the first transmission unit 14a.

One of the clamping members 10 is connected to the rotation unit 21 to rotate together with the rotation unit 21, thereby allowing the rotor 30 to rotate.

Meanwhile, a first adjustment bolt 17a for allowing to apply a preload to the piezoelectric unit 12 may be installed at the clamping member 10. Referring to FIG. 3, an example where the first adjustment bolt 17a is inserted through the coupling unit 13 of the clamping member 10 to contact both ends of the piezoelectric unit 12 is shown.

Since the first adjustment bolt 17a adjusts the amount of rotation at the coupling unit 13 of the clamping member 10 to adjust the degree of pressurization to the coupling unit 13, the preload applied to the piezoelectric unit 12 is adjusted.

In addition, a second adjustment bolt 17b may be installed at the clamping member 10 to adjust an initial gap between the gripping unit 11 and the rotor 30. Referring to FIG. 3, the second adjustment bolt 17b is inserted into the gripping units 11 at both ends of the clamping member 10, and an example where the second adjustment bolt 17b is installed to contact the inner circumference of the rotor 30 is shown.

Since the second adjustment bolt 17b adjusts the amount of rotation at the gripping unit 11 at both ends of the clamping member 10, the initial gap between the gripping unit 11 and the rotor 30 is adjusted.

Figure 5A:
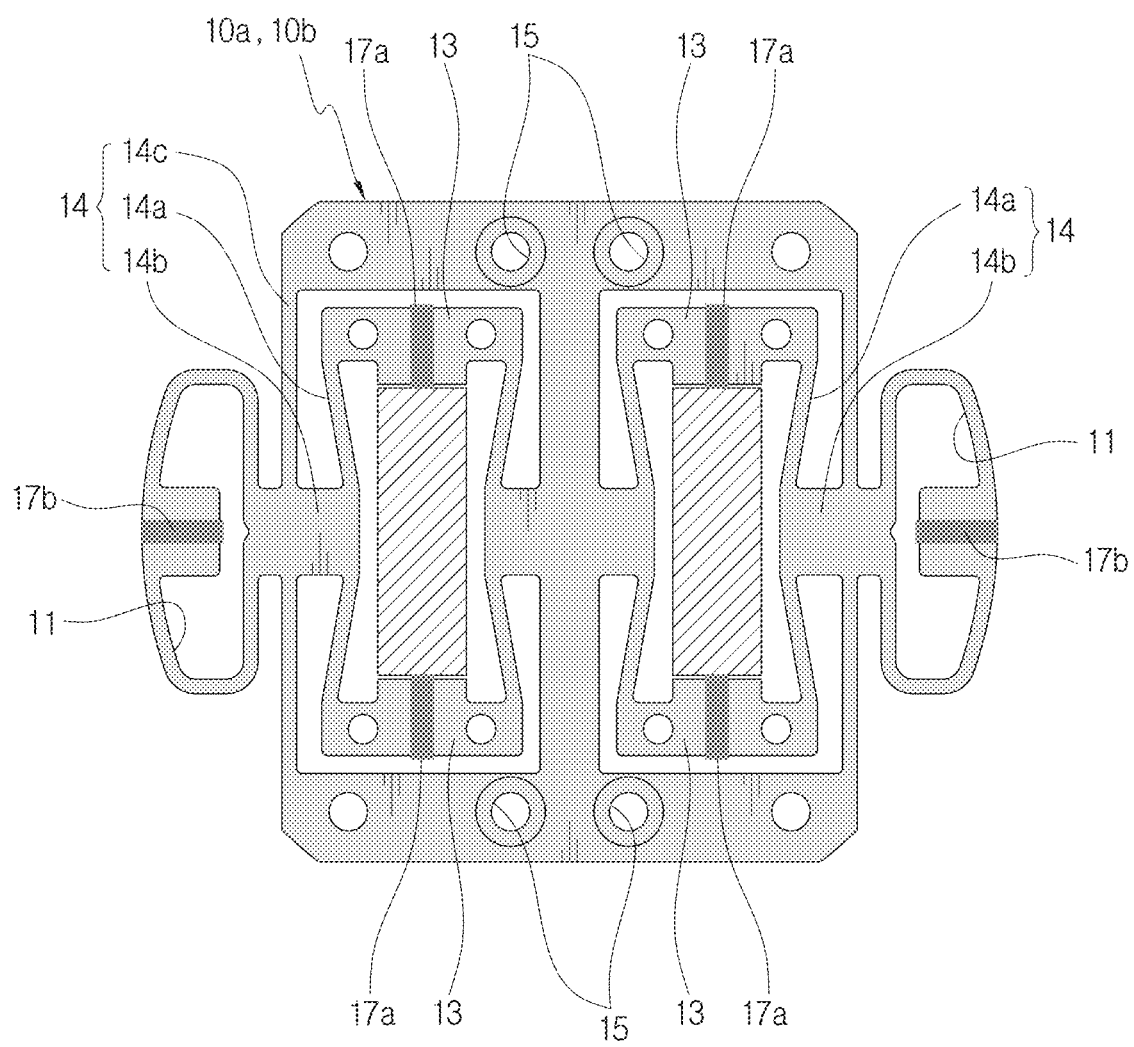
FIG. 5A is a sectional view showing a state before the clamping member operates.
Figure 5B:
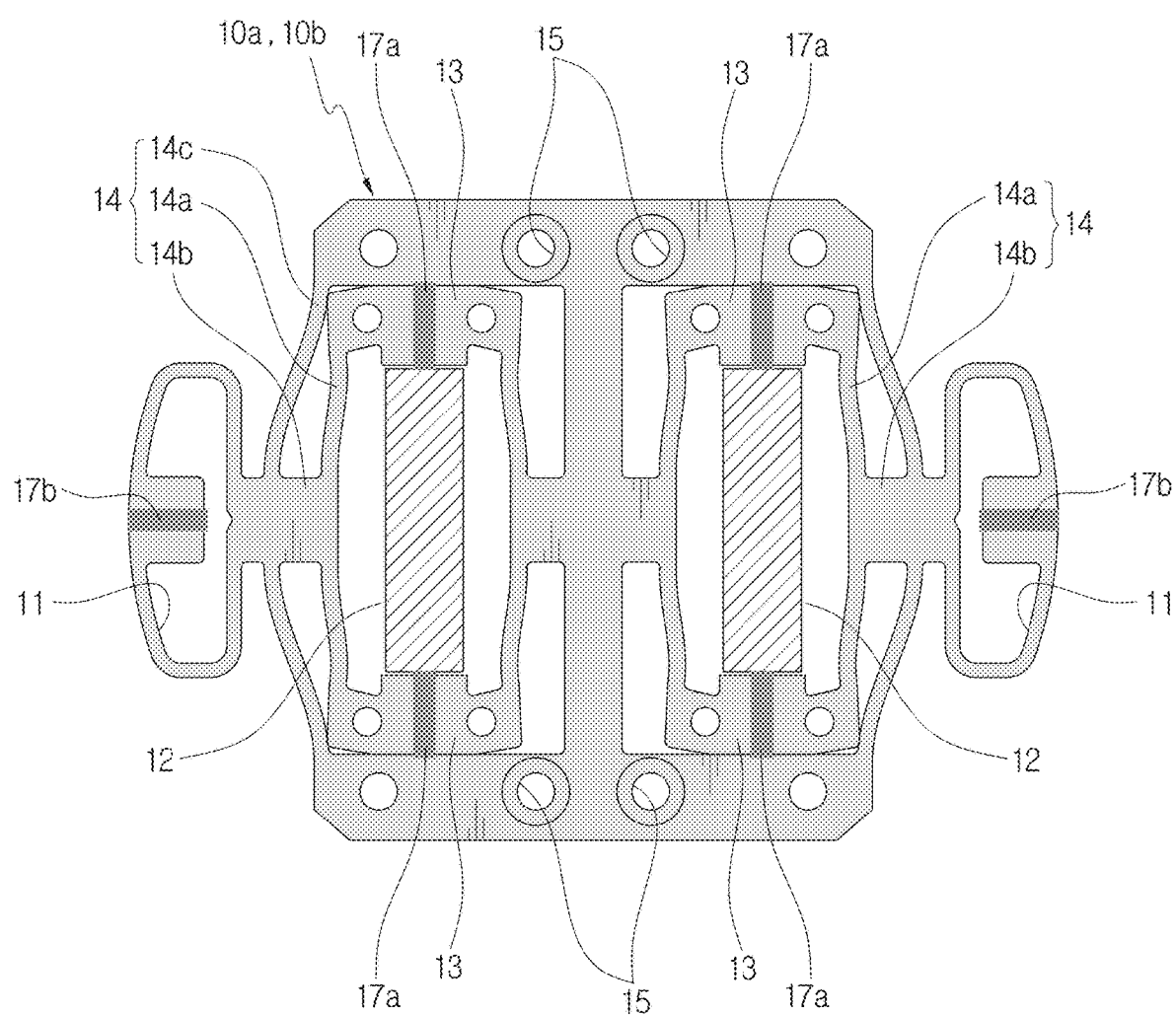
FIG. 5B is a sectional view showing a state after the clamping member operates.

FIG. 5A is a sectional view showing a state before the clamping member 10 operates, and FIG. 5B is a sectional view showing a state after the clamping member 10 operates.

Referring to FIGS. 5A and 5B, an operation of the clamping member 10 to grip the rotor 30 will be described.

Referring to FIG. 5A, before the piezoelectric unit 12 operates, the coupling units 13 at both ends of the piezoelectric unit 12 are disposed in an initial state, and the first transmission unit 14a is disposed to be inclined by a predetermined angle toward the piezoelectric unit 12. In addition, the second transmission unit 14b is disposed in a direction away from the inner circumference of the rotor 30, so the gripping unit 11 does not pressurize the inner circumference of the rotor 30.

Referring to FIG. 5B, by the operation of the piezoelectric unit 12, the coupling units 13 at both ends of the piezoelectric unit 12 are disposed relatively away from each other in comparison to the time before the piezoelectric unit 12 operates. Accordingly, the first transmission unit 14a is disposed to be inclined by a predetermined angle away from the piezoelectric unit 12. In addition, since the second transmission unit 14b is disposed in a direction closer to the inner circumference of the rotor 30, the gripping unit 11 pressurizes the inner circumference of the rotor 30.

The driving member 20 is installed at the inner circumference of the rotor 30 and includes a rotation unit 21. The rotation unit 21 is elastically deformed to rotate by a predetermined angle and then return to its original state.

The driving member 20 may further include a piezoelectric unit 22. The piezoelectric unit 22 elastically deforms in one direction. There may be provided two piezoelectric units 22 at one diagonal locations of the driving member 20.

The piezoelectric unit 22 may be an actuator, and may be, for example, a stack-type piezoelectric element.

In addition, piezoelectric unit 22 may employ a Rhombus type mechanism so as to extend the displacement of the piezoelectric unit and apply a preload.

When the two piezoelectric units 22 make a tensile strain, the rotation unit 21 is rotated by a predetermined angle. Also, when the two piezoelectric units 22 return to their initial state, the rotation unit 21 returns to its original state.

The driving member 20 may further include a support unit 24 and a connection hole 25.

The support unit 24 supports both ends of the piezoelectric unit 22 and is connected to the rotation unit 21 to rotate the rotation unit 21 in a state where the piezoelectric unit 22 makes a tensile strain.

The connection hole 25 is formed in the rotation unit 21 so that the rotation unit 21 may be connected to rotate together with the clamping member 10.

The driving member 20 may further have a maintaining unit 27. Two maintaining units 27 may be provided at the other diagonal locations of the driving member 20 to elastically support the rotation unit 21.

In addition, the maintaining unit 27 may be arranged at a diagonal position, and serves to guide a linear motion occurring in the piezoelectric unit 22 to a rotational motion.

Figure 6A:
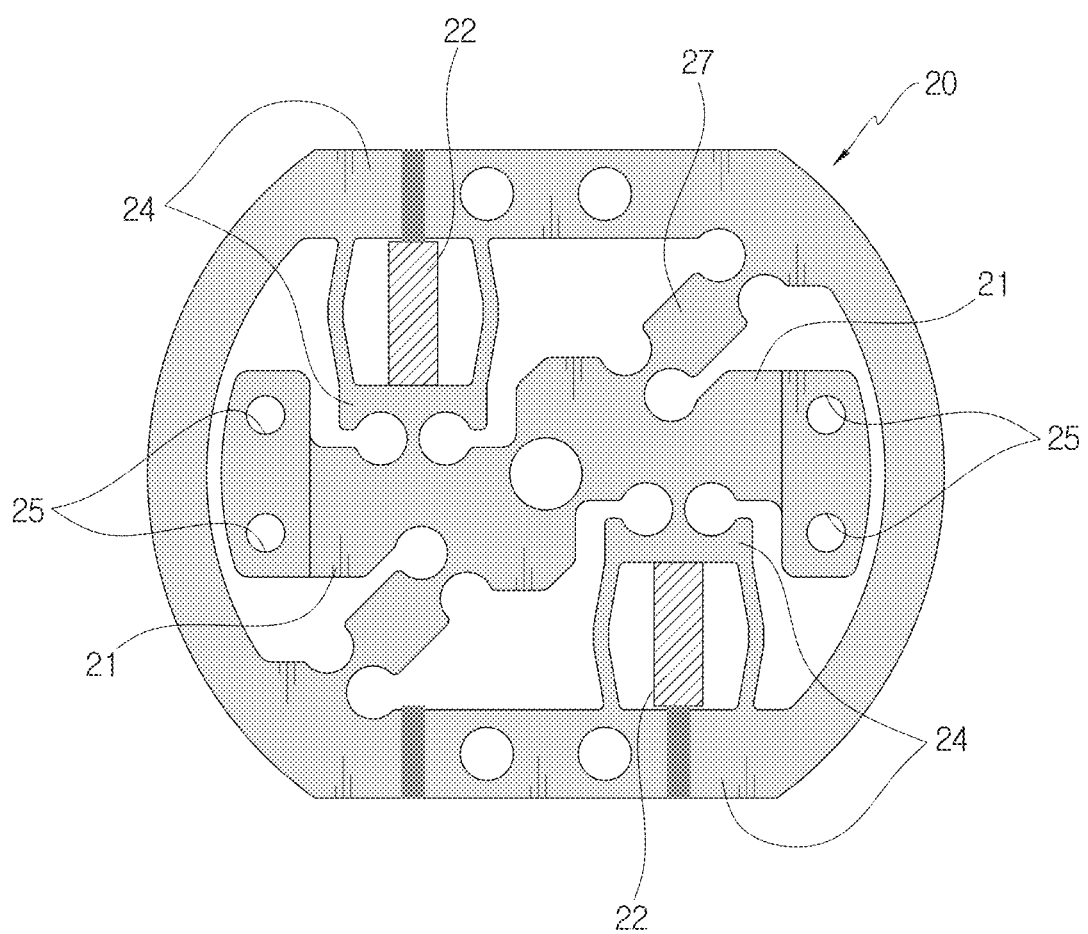
FIG. 6A is a sectional view showing a state before the driving member operates.
Figure 6B:
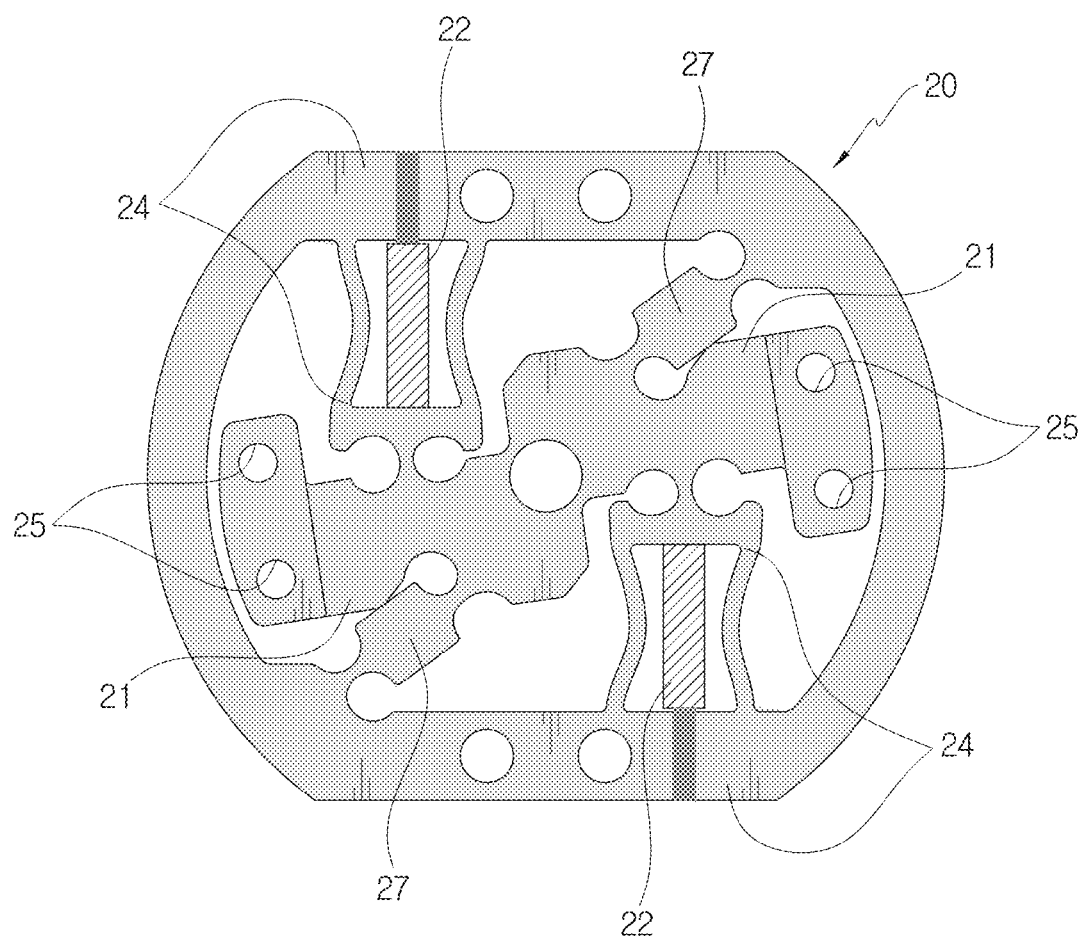
FIG. 6B is a sectional view showing a state after the driving member operates.

FIG. 6A is a sectional view showing a state before the driving member 20 operates, and FIG. 6B is a sectional view showing a state after the driving member 20 operates.

Referring to FIGS. 6A and 6B, an operation in which the driving member 20 rotates will be described.

Referring to FIG. 6A, before the piezoelectric unit 22 operates, the support unit 24 at both ends of the piezoelectric unit 22 are disposed relatively closer to each other due to a preload in comparison to the time when the piezoelectric unit 22 operates, and the rotation units 21 are not rotated to be arranged side to side in a horizontal direction in FIG. 6A.

Although not shown in FIG. 6A, since the rotation unit 21 of the driving member 20 does not rotate, the second clamping member 10b connected to the driving member 20 is also in a state of being not rotated.

Referring to FIG. 6B, by the operation of the piezoelectric unit 22, the support unit 24 at both ends of the piezoelectric unit 22 are disposed relatively away from each other in comparison to the time before the piezoelectric unit 22 operates, and accordingly the rotation unit 21 is rotated and arranged in a state of being rotated by a predetermined angle in FIG. 6B. Although not shown in FIG. 6B, since the rotation unit 21 of the driving member 20 is rotated, the second clamping member 10b connected to the driving member 20 is also in a rotated state.

In addition, the rotary motor 100 of the present disclosure may further include a rotor 30, a shaft 40, and a bearing unit 50.

The rotor 30 is configured to accommodate the clamping member 10 and driving member 20 described above. In addition, the rotor 30 is gripped and released by the clamping member 10, and is rotated by the rotation of the driving member 20.

The rotor 30 may have a cylindrical structure, as shown in FIGS. 1 and 2. The rotor 30 may have a screw hole formed at the top thereof along a circumferential direction so that a bolt may be coupled therein. Meanwhile, FIGS. 1 and 2 show an example where a base plate 38 forming the bottom surface of the rotary motor 100 is installed under the rotor 30.

The shaft 40 is coupled to rotor 30 and may transmit the generated rotational force of the rotor 30 to the outside. As an example, the shaft 40 includes a plate member 43, and the plate member 43 has a coupling hole 43a provided to be coupled to the rotor 30 by a bolt as shown in FIGS. 1 and 2. Therefore, the shaft 40 is rotated integrally with the rotor 30.

Although not clearly shown in the drawings, a bushing or a power transmission mechanism may be installed at the shaft 40.

Referring to FIG. 2, the bearing unit 50 may include a first holder 51 for preventing a bearing 54 from deviating upward, a second holder 52 for preventing the bearing 54 from deviating laterally or downward, a bearing 54 for allowing the shaft 40 to rotate without being disturbed when the force transmitted from the rotor 30 rotates the shaft 40, a shaft holder 56 for gripping the shaft 40 not to deviate from the bearing 54, and a holder fixing member 58 for fixing the second holder 52.

Referring to FIGS. 7A and 7B, a motion sequence of the clamping member 10 and the driving member 20 during six steps will be described.

Steps 0 to 6 described below may continue for a predetermined time.

First, a (clockwise) motion sequence in which the rotor 30 rotates in a clockwise direction will be described.

In an initial state (0 to 1 states), the first and second clamping members 10a, 10b operate to grip the inner circumference of the rotor 30. In this state, the driving member 20 does not operate.

In Step 1 (1 to 2 states), the first clamping member 10a keeps gripping the inner circumference of the rotor 30. The operation of the second clamping member 10b is released, and the driving member 20 does not operate yet.

In Step 2 (2 to 3 states), the driving member 20 rotates by a predetermined angle in a counterclockwise direction and maintains this state. In addition, the first clamping member 10a maintains the state of gripping the inner circumference of the rotor 30, and the second clamping member 10b does not operate to maintain the state of not gripping the inner circumference of the rotor 30. Meanwhile, the second clamping member 10b is in a state of being rotated together with the driving member 20.

In Step 3 (3 to 4 states), the driving member 20 maintains the state of being rotated by a predetermined angle in a counterclockwise direction. In addition, the first clamping member 10a maintains the state of gripping the inner circumference of the rotor 30. The second clamping member 10b maintains the state of being rotated together with the driving member 20 and operates to grip the rotor 30.

In Step 4 (4 to 5 states), the driving member 20 maintains the state of being rotated by a predetermined angle in a counterclockwise direction. In addition, the second clamping member 10b also maintains the state of being rotated together with the driving member 20, and operates to grip the rotor 30. The operation of the first clamping member 10a is released to come into a state of not gripping the inner circumference of the rotor 30.

In Step 5 (5 to 6 states), the driving member 20 returns to its original position from the rotated state, and the second clamping member 10b also returns to its original position together with the driving member 20, thereby rotating the rotor 30 in a counterclockwise direction. The first clamping member 10a maintains the state of not gripping the inner circumference of the rotor 30.

Next, a (counter clockwise) motion sequence in which the rotor 30 rotates in a counterclockwise direction will be described.

In an initial state (0 to 1 states), the first and second clamping members 10a, 10b operate to grip the inner circumference of the rotor 30. In this state, the driving member 20 does not operate.

In Step 1 (1 to 2 states), the second clamping member 10b maintains the state of gripping the inner circumference of the rotor 30. The operation of the first clamping member 10a is released, and the driving member 20 does not operate yet.

In Step 2 (2 to 3 states), the driving member 20 is rotated by a predetermined angle in a counterclockwise direction. In addition, the driving member 20 maintains the state of being rotated. Also, since the second clamping member 10b maintains the state of gripping the inner circumference of the rotor 30, the rotor 30 rotates in a counterclockwise direction. The first clamping member 10a does not operate to maintain the state of not gripping the inner circumference of the rotor 30. Meanwhile, the second clamping member 10b comes into a state of being rotated together with the driving member 20.

In Step 3 (3 to 4 states), the driving member 20 maintains the state of being rotated by a predetermined angle in a counterclockwise direction. In addition, the second clamping member 10b maintains the state of gripping the inner circumference of the rotor 30. The second clamping member 10b maintains the state of being rotated together with the driving member 20, and operates to grip the rotor 30. The first clamping member 10a also operates to grip the inner circumference of the rotor 30.

In Step 4 (4 to 5 states), the driving member 20 maintains the state of being rotated by a predetermined angle in a counterclockwise direction. In addition, the second clamping member 10b maintains the state of being rotated together with the driving member 20. Meanwhile, the operation of the second clamping member 10b is released not to grip the rotor 30. The first clamping member 10a maintains the state of gripping the inner circumference of the rotor 30.

In Step 5 (5 to 6 states), the driving member 20 returns to its original position from the rotated state, and the second clamping member 10b also returns to its original position together with the driving member 20. However, since the second clamping member 10b is in the state of not gripping the inner circumference of the rotor 30, the rotor 30 does not rotate. The first clamping member 10a maintains the state of gripping the inner circumference of the rotor 30.

The present disclosure implements a small inch worm mechanism based on a piezoelectric element and a flexible mechanism, so it is possible to output a larger torque compared to other driving principles using a piezoelectric element.

In addition, in the present disclosure, it is possible to manufacture a small motor by applying a stack-type piezoelectric element actuator with a short length.

In addition, in the present disclosure, it is possible to increase the output displacement of the actuator by applying a displacement expansion mechanism.

In the present disclosure, an assembly error is reduced by applying an adjustment bolt to enable the adjustment of the gap between the clamping member and the rotor.

In the present disclosure, it is possible to obtain a larger torque output by rotating a drum-shaped rotor instead of a shaft.

The rotary motor 100 as described above is not limited to the configuration and method of the embodiments described above, but the embodiments may be modified in various ways by combining the embodiments entirely or selectively.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

The invention claimed is:

1. A rotary motor, comprising:
   a clamping member having a gripping unit installed at an inner circumference of a rotor to grip the rotor during a predetermined time; and
   a driving member installed at the inner circumference of the rotor and having a rotation unit configured to make an elastic deformation to rotate by a predetermined angle and then return to an original state so that the rotor is rotated.

2. The rotary motor according to claim 1,
   wherein there are provided two clamping members, and the two clamping members are disposed at both sides with the driving member being interposed therebetween.

3. The rotary motor according to claim 2,
   wherein the clamping member further includes a piezoelectric unit configured to elastically deform in one direction, and when the piezoelectric unit makes a tensile strain, the gripping unit grips the inner circumference of the rotor.

4. The rotary motor according to claim 3,
   wherein the clamping member further includes:
   a coupling unit configured to support both ends of the piezoelectric unit; and
   a transmission unit connected to the coupling unit to transmit a stress to the gripping unit in a direction intersecting with the one direction.

5. The rotary motor according to claim 2,
   wherein the two clamping members are disposed in a state of being rotated by the predetermined angle based on a rotary shaft around which the rotor rotates.

6. The rotary motor according to claim 5,
   wherein one of the clamping members is connected to the rotation unit to rotate together with the rotation unit, so that the rotor is rotated.

7. The rotary motor according to claim 1,
wherein the driving member further includes two piezoelectric units configured to elastically deform in one direction and provided at one diagonal locations of the driving member, and
when the two clamping members make a tensile strain, the rotation unit is rotated by the predetermined angle, and when the two clamping members return to an initial state, the rotation unit returns to the original state.

8. The rotary motor according to claim 7,
wherein the driving member further includes:
a support unit configured to support both ends of the piezoelectric unit and connected to the rotation unit to rotate the rotation unit in a state where the piezoelectric unit makes a tensile strain; and
a connection hole formed in the rotation unit so that the rotation unit is connected to rotate together with the clamping member.

9. The rotary motor according to claim 8,
wherein the driving member further includes two maintaining units provided at the other diagonal locations of the driving member to elastically support the rotation unit.

\* \* \* \* \*